(12) United States Patent
Procopio

(10) Patent No.: US 8,458,194 B1
(45) Date of Patent: Jun. 4, 2013

(54) SYSTEM AND METHOD FOR CONTENT-BASED DOCUMENT ORGANIZATION AND FILING

(75) Inventor: Michael Jeffrey Procopio, Boulder, CO (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/363,152

(22) Filed: Jan. 31, 2012

(51) Int. Cl.
*G06F 17/30* (2006.01)

(52) U.S. Cl.
USPC ............................................. 707/749

(58) Field of Classification Search
USPC .................................. 707/706, 723, 748, 749
See application file for complete search history.

(56) References Cited

U.S. PATENT DOCUMENTS

| | | | |
|---|---|---|---|
| 5,963,940 A | 10/1999 | Liddy et al. | |
| 6,236,987 B1 | 5/2001 | Horowitz et al. | |
| 6,349,307 B1 | 2/2002 | Chen | |
| 7,065,532 B2 | 6/2006 | Elder et al. | |
| 7,080,082 B2 | 7/2006 | Elder et al. | |
| 7,103,609 B2 | 9/2006 | Elder et al. | |
| 7,130,844 B2 | 10/2006 | Elder et al. | |
| 7,249,123 B2 | 7/2007 | Elder et al. | |
| 7,257,569 B2 | 8/2007 | Elder et al. | |
| 7,765,212 B2 | 7/2010 | Surendran et al. | |
| 7,853,594 B2 | 12/2010 | Elder et al. | |
| 7,860,811 B2 | 12/2010 | Flinn et al. | |
| 8,255,421 B2 * | 8/2012 | Maeda et al. | 707/791 |
| 2004/0088315 A1 | 5/2004 | Elder et al. | |
| 2004/0088322 A1 | 5/2004 | Elder et al. | |
| 2004/0088649 A1 | 5/2004 | Elder et al. | |
| 2004/0254911 A1 | 12/2004 | Grasso et al. | |
| 2005/0198044 A1* | 9/2005 | Kato et al. | 707/100 |
| 2006/0195461 A1 | 8/2006 | Lo et al. | |
| 2007/0078889 A1 | 4/2007 | Hoskinson | |
| 2007/0150470 A1 | 6/2007 | Brave et al. | |
| 2009/0287682 A1 | 11/2009 | Fujioka et al. | |
| 2009/0319907 A1 | 12/2009 | Tokuda | |
| 2010/0003658 A1* | 1/2010 | Fadel et al. | 434/322 |
| 2010/0023311 A1* | 1/2010 | Subrahmanian et al. | 704/2 |
| 2010/0094879 A1* | 4/2010 | Donnelly et al. | 707/749 |
| 2010/0205541 A1* | 8/2010 | Rapaport et al. | 715/753 |
| 2011/0016121 A1* | 1/2011 | Sambrani et al. | 707/734 |
| 2011/0029534 A1* | 2/2011 | Maeda et al. | 707/738 |
| 2011/0113040 A1 | 5/2011 | Bickel et al. | |
| 2011/0145719 A1 | 6/2011 | Chen et al. | |

(Continued)

OTHER PUBLICATIONS

U.S. Appl. No. 13/363,024, filed Jan. 31, 2012, Procopio, et al.

(Continued)

*Primary Examiner* — Cam-Linh Nguyen
(74) *Attorney, Agent, or Firm* — Young, Basile, Hanlon & MacFarlane, P.C.

(57) ABSTRACT

A method for categorizing documents may include receiving topic information for a source document, the information including at least one topic and a weight for each topic, where the topic relates to content of the source document, and the weight represents how strongly the topic is associated with the source document. Similarity scores may be generated based on a weight of each topic in the source document and the weight of the same topic in each document within one or more sets of documents, where each document in the one or more sets of documents comprises topic information. A confidence score may be generated, based on the similarity scores, for each of the document sets. One or more document sets may be selected based on the confidence scores and may be output to a user.

19 Claims, 5 Drawing Sheets

U.S. PATENT DOCUMENTS

2011/0258229 A1   10/2011   Ni et al.
2012/0136812 A1    5/2012   Brdiczka
2012/0173561 A1    7/2012   Kim et al.
2012/0254191 A1* 10/2012   Sanyal et al. ................. 707/744

OTHER PUBLICATIONS

U.S. Appl. No. 13/363,067, filed Jan. 31, 2012, Procopio, et al.
U.S. Appl. No. 13/363,126, filed Jan. 31, 2012, Procopio.
U.S. Appl. No. 13/363,094, filed Jan. 31, 2012, Procopio, et al.
U.S. Appl. No. 13/363,210, filed Jan. 31, 2012, Procopio.
U.S. Appl. No. 13/363,169, filed Jan. 31, 2012, Procopio.
U.S. Appl. No. 13/363,195, filed Jan. 31, 2012, Procopio.
U.S. Appl. No. 13/363,221, filed Jan. 31, 2012, Procopio.
U.S. Office Action, mailed on Nov. 21, 2012, in the related U.S. Appl. No. 13/363,169.
Notice of Allowance mailed on Feb. 11, 2013, in the related U.S. Appl. No. 13/363,221.
James Allan, "Topic Detection and Tracking-Event-Based Information Organization," 2002, Kluwer Academic Publishers, Norwell, Massachusetts, USA; http://books.google.com/books?hl=en&lr=&id=50hnLI__Jz3cC&oi=fnd&pg=PR9&dq=topic+detection+and+tracking+event-based+information+organization&ots=nfu5nDwUaO&sig=U2ITFv2__AMnciqo9J8WLaS91v98#v=onepage&q=topi%20detection%20and%20tracking%20event-based%20inform&f=false (last visited on Jan. 31, 2012).
Stefan Siersdorfer and Sergej Sizov, "Automatic Document Organization in a P2P Environment," 2006, Springer, Berlin, Germany; http://www.springerlink.com/content/27140h768278629r/ (last visited on Jan. 31, 2012).
Dr. E. Garcia, "Cosine Similarity and Term Weight Tutorial," http://www.miislita.com/information-retrieval-tutuorial/cosine-similarity-tutorial.html (last visited on Jan. 30, 2012).
U.S. Appl. No. 13/363,067, filed Jan. 31, 2012, entitled "System and Method for Indexing Documents".
U.S. Appl. No. 13/363,221, filed Jan. 31, 2012, entitled "System and Method for Determining Similar Topics".
U.S. Appl. No. 13/363,024, filed Jan. 31, 2012, entitled "System and Method for Computation of Document Similarity".
U.S. Appl. No. 13/363,126, filed Jan. 31, 2012, entitled "System and Method for Determining Active Topics".
U.S. Appl. No. 13/363,094, filed Jan. 31, 2012, entitled "System and Method for Automatically Determining Document Content".
U.S. Appl. No. 13/363,210, filed Jan. 31, 2012, entitled "System and Method for Determining Topic Authority".
U.S. Appl. No. 13/363,169, filed Jan. 31, 2012, entitled "System and Method for Determining Topic Interest"; and.
U.S. Appl. No. 13/363,195, filed Jan. 31, 2012, entitled "System and Method for Determining Similar Users."

\* cited by examiner

DOCUMENT SET CONFIDENCE SCORES FOR SOURCE DOCUMENT 300

| DOC. SET | CONFIDENCE SCORE MEAN | CONFIDENCE SCORE STANDARD DEVIATION |
|---|---|---|
| DOC. SET A | $\dfrac{(0+0+0+0.25)}{4} = 0.06$ | $\dfrac{\sqrt{(-0.06)^2+(-0.06)^2+(-0.06)^2+(0.19)^2}}{4} = 0.13$ |
| DOC. SET B | $\dfrac{(0.7+0.4+0.6)}{3} = 0.57$ | $\dfrac{\sqrt{(0.13)^2+(-0.17)^2+(0.03)^2}}{3} = 0.15$ |
| DOC. SET C | $\dfrac{(0.8+0.9)}{2} = 0.85$ | $\dfrac{\sqrt{(-0.05)^2+(0.05)^2}}{2} = 0.07$ |

FIG. 3

| DOC. SET 420 | CONFIDENCE SCORE(S) 430 | SUGGESTED / NOT SUGGESTED 440 |
|---|---|---|
| DOC. SET C — 422 | 0.85 +/- 0.07 — 432 | SUGGESTED |
| DOC. SET B — 424 | 0.57 +/- 0.15 — 434 | SUGGESTED |
| DOC. SET A — 426 | 0.06 +/- 0.13 — 436 | NOT SUGGESTED |

RANKED DOCUMENT SETS 410

400

442 (SUGGESTED rows)
444 (NOT SUGGESTED row)

*FIG. 4*

SYSTEM AND METHOD FOR CONTENT-BASED DOCUMENT ORGANIZATION AND FILING

CROSS REFERENCES TO RELATED APPLICATIONS

The following U.S. patent applications are filed concurrently herewith and are assigned to the same assignee hereof and contain subject matter related, in certain respect, to the subject matter of the present application. These patent applications are incorporated herein by reference.

Ser. No. 13/363,024 is now pending, filed Jan. 31, 2012 for "SYSTEM AND METHOD FOR COMPUTATION OF DOCUMENT SIMILARITY";

Ser. No. 13/363,067 is now pending, filed Jan. 31, 2012 for "SYSTEM AND METHOD FOR INDEXING DOCUMENTS";

Ser. No. 13/363,126 is now pending, filed Jan. 31, 2012 for "SYSTEM AND METHOD FOR DETERMINING ACTIVE TOPICS";

Ser. No. 13/363,094 is now pending, filed Jan. 31, 2012 for "SYSTEM AND METHOD FOR AUTOMATICALLY DETERMINING DOCUMENT CONTENT";

Ser. No. 13/363,210 is now pending, filed Jan. 31, 2012 for "SYSTEM AND METHOD FOR DETERMINING TOPIC AUTHORITY";

Ser. No. 13/363,169 is now pending, filed Jan. 31, 2012 for "SYSTEM AND METHOD FOR DETERMINING TOPIC INTEREST";

Ser. No. 13/363,195 is now pending, filed Jan. 31, 2012 for "SYSTEM AND METHOD FOR DETERMINING SIMILAR USERS"; and Ser. No. 13/363,221 is now pending, filed Jan. 31, 2012 for "SYSTEM AND METHOD FOR DETERMINING SIMILAR TOPICS."

BACKGROUND

Increases in electronic storage capacity, shared access to public content, and flexibility in content storage have had an impact on electronic file storage. Despite a wide range of applications, document filing and organization may be cumbersome. A method and/or system for document organizing and/or filing based on, for example, content of a document may be desirable.

SUMMARY

Briefly, aspects of the present disclosure are directed to methods and systems for categorizing documents which may include receiving topic information for a source document, the information including at least one topic and a weight for each topic, where the topic relates to content of the source document, and the weight represents how strongly the topic is associated with the source document. Similarity scores may be generated based on a weight of each topic in the source document and the weight of the same topic in each document within one or more sets of documents, where each document in the one or more sets of documents comprises topic information. A confidence score may be generated, based on the similarity scores, for each of the document sets. One or more document sets may be selected based on the confidence scores and may be output to a user.

This SUMMARY is provided to briefly identify some aspects of the present disclosure that are further described below in the DESCRIPTION. This SUMMARY is not intended to identify key or essential features of the present disclosure nor is it intended to limit the scope of any claims.

The terms "aspects" is to be read as "at least one aspect." The aspects described above and other aspects of the present disclosure described herein are illustrated by way of example(s) and not limited in the accompanying figures.

BRIEF DESCRIPTION OF THE DRAWING

A more complete understanding of the present disclosure may be realized by reference to the accompanying figures in which:

FIG. 3 is a diagram depicting document set confidence scores according to aspects of the present disclosure;

FIG. 4 is a diagram depicting ranked document sets according to aspects of the present disclosure.

Figure 1:
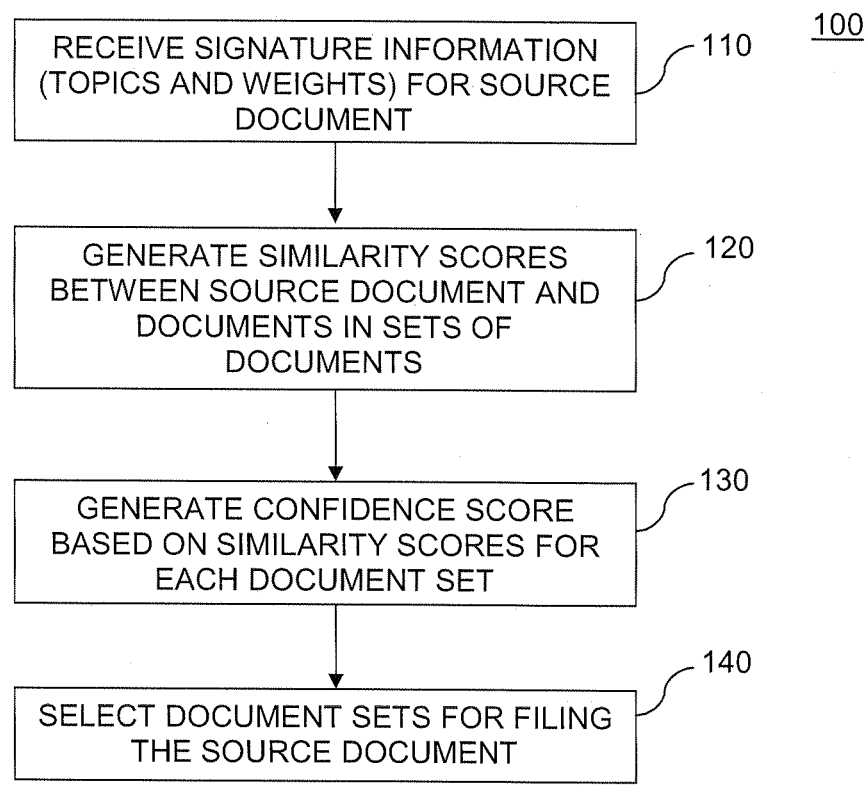
FIG. 1 is a flowchart of a method according to aspects of the present disclosure.

The illustrative aspects are described more fully by the Figures and detailed description. The present disclosures may, however, be embodied in various forms and are not limited to specific aspects described in the Figures and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and aspects of the disclosure, as well as specific examples thereof, are intended to encompass both structural and functional equivalents thereof. Additionally, it is intended that such equivalents include both currently known equivalents as well as equivalents developed in the future, e.g., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the drawings are not drawn to scale.

Figure 5:
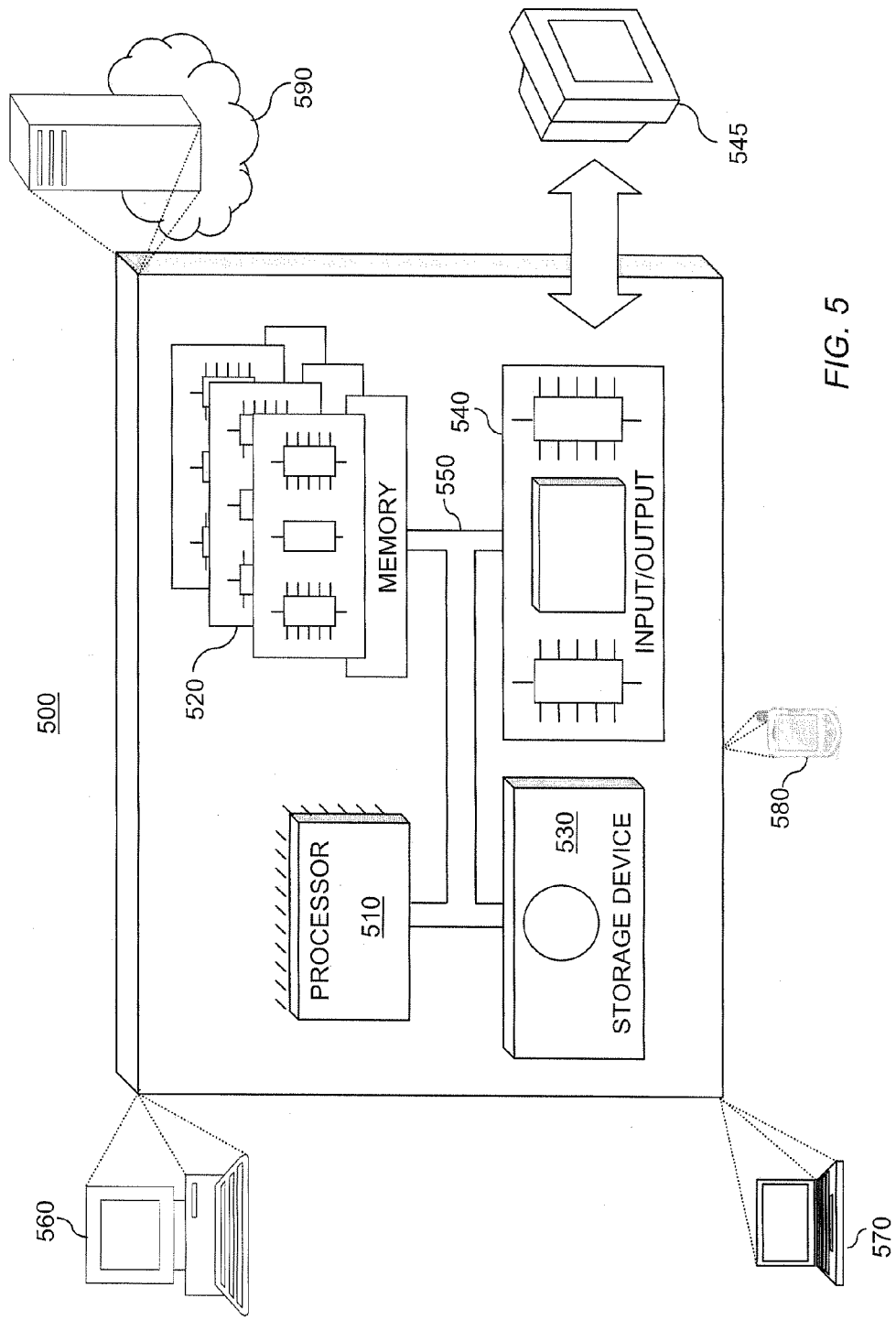
FIG. 5 is a schematic diagram depicting a representative computer system for implementing and exemplary methods and systems for content based document organization according to aspects of the present disclosure.

In FIG. 1, there is shown a flow diagram 100, which defines steps of a method according to aspects of the present disclosure. Methods and systems of the present disclosure may be implemented using, for example, a computer system 500 as depicted in FIG. 5 or any other system and/or device.

In operation 110, signature information for a source document may be received by, for example, system 500. Signature information (e.g., topic information, document signature) for a source document may include, for example, at least one topic and a weight for each topic. Topic(s) may, for example, relate to content and/or text of a source document, and a weight for a topic may, for example, represent how strongly the topic is associated with the source document.

A source document and/or other documents discussed herein may include document text or content. Document text may be, for example, a text-based representation of a document. The document may include text (e.g., word processing document, text file, portable document format (pdf) spreadsheet or presentation), or may have text associated therewith, such as in a transcript, when the document is a video (e.g., a web-based video or any other type of video) or an audio file (e.g., an audio recording, podcast, or any type of audio), or another type of electronically stored file. Document text may be present in a document text file separate from the document. In that case, the document text file may be linked to and/or stored with the document and/or may be stored separately. It will be understood that operations involving the text of a document may be performed on or with the document or the document text file depending on the location of text.

Signature information (e.g., topic information, document signature) for a source document or other document(s) may include, for example, at least one topic and a weight for each topic. A topic (e.g., document topic) may relate, for example, to content or text of a document (e.g., a source document), and a weight for each topic may represent or quantify how strongly the topic is associated with the source document.

Topics may be, for example, categories, abstract ideas, subjects, things, and/or concepts representing the content or subject matter of a document. Topics may be, for example, an abstract notion of what a document text pertains to, is related to, or is about. A topic may, in some aspects, be a concept that at least a portion of the document is about. A topic may or may not be a term present in a document text but may be, for example, associated with one or more terms present in a document and may be generated by natural language processing or other processes based on one or more terms in a document and/or other information. For example, a document may include text about cars, planes, and boats, all of which appear as terms verbatim in the document. More abstractly, however, it may be determined that the document is about "vehicles" and "modes of transportation." Topics associated with the document may, therefore, be "vehicles," "modes of transportation," and/or other topics.

A weight (e.g., a topic weight or confidence score) may represent how strongly a topic is associated with a document (e.g., document text). A weight may be, for example, a percentage (e.g., between 0% and 100%), a numeric value (e.g., between 0 and 1.0 or any other range), a vector, a scalar, or another parameter, which quantifies or represents how strongly a topic is associated with a document. For example, a document may include text or information relating to one or more topics, and a weight associated with each topic may represent or quantify how much a document text pertains to, is about, or is related to each topic. A sum of weights for all topics associated with a document may, for example, be equal to 1.0, 100%, or another value.

Topics related to text or content of a document and weights associated with each topic may be generated using natural language processing (NLP) or a similar method or process.

In operation 120, similarity scores between a source document and documents in one or more sets of documents may be generated. A set of documents may be, for example, a folder, bin, bucket, tag, label, collection, or other data storage location. A set of documents may include, for example, one or more documents stored in or associated with a folder, a bin, a bucket, a tag, a label, or other data storage location. A source document may, in some aspects, be included in or be a member of one or more document sets. Each document in a document set may include or be associated with a document signature (e.g., including at least one topic and a weight for each topic).

A document signature of a source document may, for example, be compared to each document signature associated with one or more documents in a set of documents. Each comparison may be between two documents (e.g., a source document and a document in a set of documents). In comparing document signatures, a weight of a topic associated with a source document may be compared to a weight of the same topic in each document within a set of documents, and similarity scores may be generated based on the comparison (e.g., one similarity score may be computed for each pair-wise document comparison between the source document and a document within the set of documents). A process of generating similarity scores may be repeated for each topic in a source document.

A similarity score may be generated by computing a sum of products of topic weights, a cosine similarity of topic weights, or using other mathematical approaches. A similarity score may be generated by computing a sum of products of topic weights in a source document and respective topic weights in a document within a document set. For example, a similarity score between a source document and a document within a document set may be computed by multiplying a weight for a topic in the source document by a weight for the same topic in each document within the document set. The process may be repeated for each topic weight in each document.

In some aspects, a particular topic weight for a document may be zero, if little or no portion of the document content or text is about the topic. In that case, a similarity score (e.g., product of a topic weight of zero in a first document multiplied the topic weight of the same topic in a second document)

may be zero (e.g., 0.0) indicating no similarity between the two documents with respect to that topic.

In some aspects, similarity scores may be generated by computing or calculating a cosine similarity of weights for each topic in a source document. A cosine similarity, Sim(S, D), may be calculated using an equation such as:

$$Sim(S, D) = \cosine\theta = \frac{S \cdot D}{\|S\|\|D\|}$$

A cosine similarity, Sim(S, D) may, for example, be calculated based on a vector representing source document topic weights, S and a vector representing topic weights of a document in a document set, D. A cosine similarity score may be, for example, a normalized dot product of a vector representing weights of topics in a source document, S and a vector representing topic weights in a document included in a document set, D. A vector representing source document topic weights, S may include weights for each topic in a source document. A vector representing topic weights of a document within a document set, D may include weights for each topic in the document within the document set. If a source document or a document within a document set does not include a topic, a weight of zero may be assigned to that topic in a vector representing topic weights for that document.

A dot product or sum of products may be normalized by dividing the dot product by a product of a norm of a vector representing source document topic weights, $\|S\|$ and a norm of a vector representing topic weights of a document in a document set, $\|D\|$. A vector norm may, for example, be a length and/or magnitude of a vector (e.g., Euclidian distance of a vector). Normalizing the dot product may, for example, ensure that each similarity score (e.g., cosine similarity score) is between 0 and 1 or another range.

A cosine similarity score or parameter may be a quantity representing how similar a vector representing weights of topics in a first document is to a vector representing weights of topics in second document. A cosine similarity score may be, for example, a number between 0.0 and 1.0, a percentage, any range of numbers, or other value.

In operation 130, confidence scores with respect to a source document may be generated for one or more document sets based on similarity scores for each of one or more documents in the one or more document sets. A confidence score associated with each of one or more document sets may be generated based on similarity scores between a source document and one or more documents within a document set. A confidence score for a document set may, in some aspects, be based on similarity scores between a source document and each document in the set of documents. A confidence score may, for example, represent or quantify how similar a source document is to at least one document and/or all documents in a document set. A confidence score may, for example, quantify or represent an average, aggregate, global, and/or overall similarity between a source document and one or more documents in a document set. A confidence score may represent, for example, a probability and/or likelihood of similarity or relatedness between a source document and a document set and/or documents within a document set.

In some aspects, a confidence score may be generated by determining a mean score, a variance score, and possibly other scores based on the similarity scores associated with documents in a document set. A mean score may be, for example, a mean, average, arithmetic mean, geometric mean, and/or harmonic mean of similarity scores between a source document and one or more documents within in a document set. A mean score for a document set may be generated, for example, by calculating an average of similarity scores between a source document and each document in a document set.

A variance score may be, for example, a standard deviation, absolute deviation, and/or other type of variance of similarity scores for each document within a set of documents. A variance score for a document set may be generated, for example, by calculating a standard deviation of similarity scores between a source document and each document in a document set.

In operation 140, one or more document sets may be selected for filing the source document. One or more document sets (e.g., sets of documents) may be selected based on, for example, confidence scores for each of the documents. Document sets may, for example, be ranked, grouped, and/or categorized based on confidence scores and one or more document sets may be selected based on the ranking, grouping and/or categorization. In one example, a highest ranked document set or document set associated with a highest confidence score may be selected. In some aspects, any number of highest ranked document sets (e.g., a top N document sets) may be selected.

According to some aspects, selecting one or more document sets may include comparing a confidence score for each document set to a threshold confidence score, categorizing the document sets into classes based on the comparison of confidence scores, and selecting one or more of the classes of document sets. A threshold confidence score may be, for example, a fixed threshold confidence score (e.g., a predetermined threshold confidence score, a static threshold confidence score), a varying threshold confidence score, or any other type of threshold confidence score. A static threshold confidence score may be any confidence score generated by, for example, a user, system 500, or any other system or process.

In some aspects, document sets may be categorized into classes or groups using an automatic grouping, clustering, or other approach. An automatic grouping, clustering, or other similar approach may be, for example, a K-means, difference in means, or other method(s). In an automatic grouping approach, a varying threshold confidence score may be generated, for example, using an automatic threshold detection or another approaches. A varying confidence score threshold may, for example, be calculated based on one or more document set confidence scores (e.g., a document set confidence score distribution). A varying threshold confidence score may, therefore, be related to the confidence score data distribution and may vary as confidence score data is added, removed, and/or altered.

For example, if a new document is added to a document set, a similarity score between the new document and a source document may be generated. As a result of the new similarity score, a confidence score associated with that document set may change. A varying threshold confidence score, which is determined based on confidence scores associated with one or more document sets, may also vary as a result changes to document(s) in one or more document sets.

Similarly, a varying confidence score may be altered if documents are removed from a document set, document(s) in a document set are altered, or based on other events or changes.

In some aspects, one or more optimal, suggested, and/or preferred filing attributes for a source document may be determined based on the selected one or more document sets. A filing attribute may be, for example, a storage location within a document set, which may be a folder, bin, bucket, tag, label, collection, or other data storage location. A filing attribute may be, for example, a data storage location and/or attribute within a data organizational structure. An organizational structure may be, for example, a directory structure (e.g., a hierarchical tree structure), file structure (e.g., a hierarchical file structure), data storage structure, and/or other type of data or file organization (e.g., within System 500). A filing attribute may be, for example, a filing location and/or attribute within a selected document set and/or a filing location and/or attribute associated with a selected document set. A document may be filed or stored in a document set (e.g., a folder, bin bucket, etc.) by adding the document to the document set. A. filing attribute may, in some aspects, be a tag, metadata, information, and/or data associated with a document.

In some aspects, one or more suggested filing attributes for a source document may be output to a user. Suggested filing attributes (e.g., location(s)) for a source document may be output to a user, for example, as a list, a table, a graphical representation, a word cloud, a graphical model, or other form of data output representing document set(s), attributes, or locations associated with document set(s). Document sets (e.g., filing locations and/or associated with filing attributes) selected based on confidence scores may be labeled, for example, suggested document sets, and suggested document sets may be output to a user as a list of "Suggested Filing Attributes," "Suggested Filing Locations," "Preferred Filing Locations," "Recommended Collections," or any other type of list. A subset of documents may be output to a user using a display device (e.g., display 545 of FIG. 5).

In some aspects, a representation of confidence scores associated with one or more selected document sets and/or suggested filing attributes may be output to a user. A representation of confidence scores may be, for example, a list of confidence scores, a graphical representation of confidence scores (e.g., a graphical model, graph, plot, bar graph, pie chart, or other graphical representation), a list of confidence scores (e.g., a list or table of confidence scores in a preview pane, window, or other displays), and/or another type of data representation.

In some aspects, a source document may be filed based on one or more filing attributes (e.g., suggested filing locations) in response user input. For example, a user may create a source document, and one or more filing attributes may be determined and output to the user based on topic information for the source document. In response, the user may provide input to, for example, system 500 requesting that the new document be filed in a filing location or with a filing attribute based on the one or more filing attributes. Based on the input, the source document may be filed in or more filing locations and/or based one or more filing attributes. In another aspect, the user may direct system 500 to file the document automatically in one or more filing locations and/or based on one or more attributes.

According to some aspects, selecting one or more document sets based on confidence scores may include generating a new document set including only a source document and selecting the new document set. As discussed in more detail below, a new document set including only a source document may be generated if, for example, confidence scores for each document set (e.g., based on similarity scores between the source document and documents within the set) are below a threshold confidence score. Confidence scores may be generated, for example, for each of one or more document sets. Each confidence score may, for example, represent a probability or likelihood that a source document should be assigned to, added to, or associated with a document set. If, for example, a likelihood that a source document should be added to any of the one or more document sets is low (e.g., below a threshold confidence score), the source document may not be topically related to documents in any of the document sets, and a new document set may be generated including only the source document.

In some aspects, a title for a new document set (e.g., including on the source document) may be generated based on the topic information associated with a source document.

In some aspects, operation 110, operation 120, operation 130, and operation 140 may be performed in response to a trigger event. Topic information for a source document may be received, similarity scores between the source document and one or more documents in one or more documents sets may be generated, confidence scores for the one or more documents sets may be generated based on the similarity scores for that document set, and one or more document sets may be selected in response to a trigger event. A trigger event may be, for example, an addition of a document to a document set (e.g., addition of a source document), creation of a new document, creation of a new document set, editing of a document in a document set, removal of a document from the document set, a change of content of a document in the set, a change of signature of a document in the set, or any other event or action, which may result in a change to an data structure, file structure, document content, or other information. A trigger event may, for example, occur at any time and may be the result of user input, other processes or systems, or other factors. Performing operation 110, 120, 130, and 140 in response to a trigger event may, for example, ensure that document filing attributes, locations, directory structures, filing structures, and other information and/or data organizational structures remain current and up to date.

In some aspects, source documents, documents in a document set, documents, and/or other information may be constantly monitored or monitored in real-time (e.g., by system 500) to identify trigger events.

Figure 2:
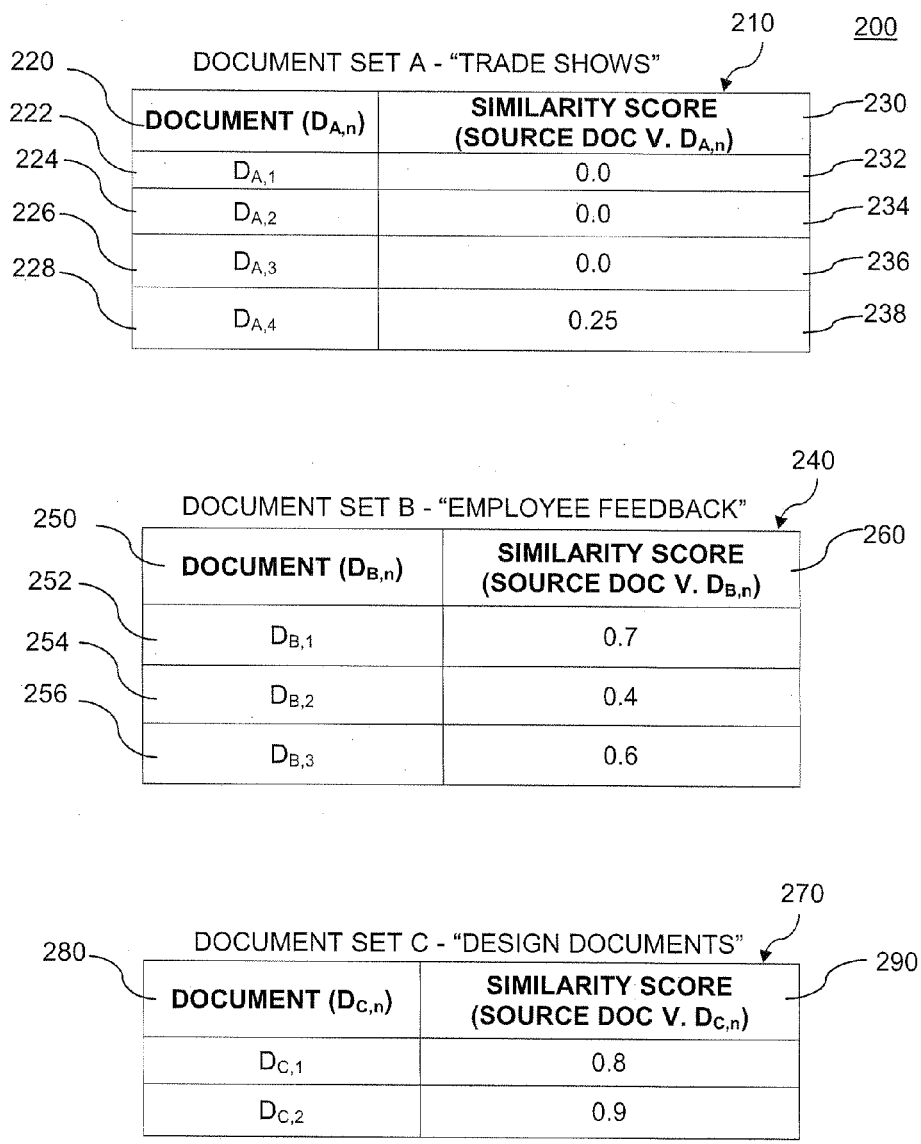
FIG. 2 is a diagram depicting similarity score information associated with one or more documents according to aspects of the present disclosure.

FIG. 2 shows a diagram 200 depicting similarity score information associated with one or more sets of documents according to aspects of the present disclosure. One more document sets (e.g., Document Set A 210, Document Set B 240, Document Set C 270) may include one or more documents. Each document set 210, 240, 270 may, for example, be associated with a title (e.g., Document Set A "Trade Shows", Document Set B "Employee Feedback", Document Set C "Design Documents"). A title associated with a document set may represent or be based on topic information (e.g., including topics and weights for each topic) associated with one or more documents in the document set.

Similarity scores for one or more document sets (e.g., Document Set A 210, Document Set B 240, Document Set C 270) may be generated. Similarity scores 230 for a first document set 210 (e.g., Document Set A "Trade Shows") may be generated, for example, based on a comparison between a source document and one or more documents 220 (e.g., Document $D_{A,1}$ 222, Document $D_{A,2}$ 224, Document $D_{A,3}$ 226, Document $D_{A,4}$ 228) in Document Set A 210.

In this example, a similarity score 232 between a source document and a first document (e.g., Document $D_{A,1}$ 222) in Document Set A 210 may be 0.0. A similarity score 234 between a source document and Document $D_{A,2}$ 224 may be 0.0. Similarity scores 236, 238 between a source document and Document $D_{A,3}$ 226 and Document $D_{A,4}$ 228 be 0.0 and 0.25, respectively. Similarity scores 230 may of course be any number (e.g., a number between 0 and 1 or any other range), percentage (e.g., between 0% and 100%), or other value.

Similarity scores 260 for a second document set 240 (e.g., Document Set B "Employee Feedback") may be generated, for example, based on a comparison between a source document and one or more documents 250 (e.g., Document $D_{B,1}$ 252, Document $D_{B,2}$ 254, Document $D_{B,3}$ 256) in Document Set B 240.

Similarity scores 290 for a third document set 270 (e.g., Document Set C "Design Feedback") may be generated, for example, based on a comparison between a source document and one or more documents 280 (e.g., Document $D_{C,1}$, Document $D_{C,2}$) in Document Set C 270.

Similarity scores 230, 260, 290 between a source document and one or more documents in one or more document sets (e.g., Document Set A 210, Document Set B 240, Document Set C 270) may be calculated using, for example, a cosine similarity, sum of products, or any other mathematical or analytical approach.

FIG. 3 shows a diagram 300 depicting document set confidence scores according to aspects of the present disclosure. Confidence scores 310, 320 for each of one or more document sets 330 (e.g., Document Set A 332, Document Set B 334, Document Set C 336) may be generated based on similarity scores for each document set 330. Confidence scores for each document set 330 may include a confidence score mean 310 (e.g., mean score, average confidence score), a confidence score variance 320 (e.g., standard deviation score, variance score), and/or other confidence scores.

In this example, a mean score 312, a standard deviation score 322, and possibly other confidence scores may be generated for a Document Set A 332. A mean score 312 for Document Set A 332 may be, for example, a mean, average, and/or arithmetic mean of document similarity scores 230 between source document and documents in Document Set A (e.g., (0+0+0+0.25)/4=0.06). A confidence score variance 322 for Document Set A 332 may be, for example, a standard deviation, absolute deviation, and/or other type of variance of similarity scores 230 between a source document and documents in Document Set A 332 (e.g., $\sqrt{(-0.06)^2+(-0.06)^2+(-0.06)^2+(0.19)^2/4}=0.13$).

In this example, a mean score 314, a standard deviation score 324, and possibly other confidence scores may be generated for a Document Set B 334. A mean score 314 for Document Set B 334 may be, for example, a mean, average, and/or arithmetic mean of document similarity scores 250 between source document and documents in Document Set B 334 (e.g., (0.7+0.4+0.6)/3=0.57). A variance score 324 for Document Set B 334 may be, for example, a standard deviation, absolute deviation, and/or other type of variance of similarity scores 260 between a source document and documents in Document Set B 334 (e.g., $\sqrt{(0.13)^2+(-0.17)^2+(0.03)^2/3}=0.15$).

Similarly, a mean score 316 (e.g., (0.8+0.9)/2=0.85), standard deviation score 326 (e.g., $\sqrt{(-0.05)^2+(0.05)^2/2}=0.07$), and possibly other confidence scores may be generated for Document Set C 336.

FIG. 4 shows a diagram 400 depicting ranked document sets according to aspects of the present disclosure. One or more document sets 420 may be categorized, ranked, and/or organized based on confidence scores 430 (e.g., mean score(s), variance score(s), and possibly other confidence score(s)). A ranked, categorized, and/or organized list of document sets 410 (e.g., a ranked list) may be generated. Document sets 420 may be ranked, organized, or grouped based on, for example, confidence scores 430 associated with the document sets 420.

In this example, document sets 420 may be ranked, categorized, and/or organized based on confidence scores 430 (e.g., mean score(s) and/or variance score(s)). Document Set C 422 may, for example, be associated with a highest confidence score (e.g., Document C confidence score 432 (e.g., 0.85+/−0.07)) and may, therefore, be a most highly ranked document set. Document Set B 424 may be, for example, associated with a second highest confidence score (e.g., Document B confidence score 434 (e.g., 0.57+/−0.15)) and may, therefore, be a second most highly ranked document set. Document Set A 426 may be, for example, associated with a lowest or third highest confidence score (e.g., Document A confidence score 436 (e.g., 0.06+/−0.13)) and may, therefore, be a lowest ranked and/or third highest ranked document set.

In some aspects, a confidence score 430 for each of one or more document sets 420 may be compared to a threshold confidence score, the one or more document sets 420 may be categorized into classes based on the comparison of confidence scores 430, and one or more classes of document sets 420 may be selected. A threshold confidence score may be, for example, a fixed threshold confidence score (e.g., a predetermined threshold confidence score); a varying threshold confidence score generated using, for example, an automatic threshold detection method, and/or another type of threshold confidence score. One or more suggested filing attributes for the source document may be determined based on the selected one or more document sets By way of example, a threshold confidence score may be, for example, a fixed threshold confidence score equal to 0.5 or any other value. Confidence scores 430 (e.g., Document Set C confidence score 432, Document Set B confidence score 434, Document Set A confidence score 436) associated with each document set 420 (e.g., Document Set C 422, Document Set B 424, and Document Set A 426) may be compared to the threshold confidence score. In the comparison operation, it may be determined that Document Set C mean score 432 (e.g., 0.85) and Document Set B mean score 434 (e.g., 0.57) are greater than threshold mean score (e.g., 0.5). It may, therefore, be determined that Document Set C 432 and Document Set B 434 are strong, relatively strong, and/or good fits for the source document. Document Set C 432 and Document Set B 434 may be categorized into a class of suggested document set(s) 442. Document Set C 422 may be, for example, a strongest fit or most highly suggested document set because Document Set C confidence score 430 includes a high mean score (e.g., 0.85) and low variance score (e.g., 0.07).

Document Set A confidence score 436 (e.g., 0.06) may be, for example, less than threshold mean score (e.g., 0.5) and Document Set A 426 may, therefore, be categorized into a class of not suggested documents 444.

In some aspects, a automatic grouping or clustering approach (e.g., a K-means, difference in means, and/or other approach) may be used to, for example, segment or categorize document sets 420 into two classes (e.g., suggested document sets 442 and not suggest document sets 444) or any other number of classes. In an automatic grouping process, a threshold confidence score may be generated based on document set confidence scores 430 using, for example, a K-means, difference in means, or other approach. Document set confidence scores 430 may be, for example, compared to the threshold confidence score and document sets 420 associated with the document set confidence scores 430 may be categorized into classes and/or groups based on the comparison.

For example, a varying threshold confidence score (e.g., 0.45) may be generated based on Document Set C confidence score 432, Document Set B confidence score 434, Document Set A confidence score 436, and possibly other confidence scores. Document Set C 422 and Document Set B 424, which are associated with confidence scores (e.g., confidence scores 432, 434) higher than the varying threshold confidence score, may be categorized into a class of suggested documents 442. Document Set A, which is associated with a confidence score 436 lower than the varying threshold confidence score, may be categorized into a class of not suggested documents 444. Document Set C 422 and Document Set B 424 may, for example, be deemed suggested filing attributes for a source document. Document Set C 422 and Document Set B 424 or a representation of Document Set C 422 and Document Set B 424 may be, for example, output to a user as suggested filing attributes for a source document.

According to some aspects, a new document set including only a source document may be generated if, for example, confidence scores (e.g., confidence scores 432, 434, 436) for each document set (e.g., document sets 422, 424, 426) are below a threshold confidence score (e.g., 0.9).

By way of example, a source document may be associated with topic information including one or more topics (e.g., bull fighting and Spain) and associated weights. The source document may be compared to, for example, one or more document sets. A first document set may include documents related to, for example, cellular telephones, games, and math. A second document set may include documents related to, for example, crafts and knitting. Confidence scores based on similarity scores between a source document and documents in a first document set may be generated. Similarly, confidence scores based on similarity scores between the source document and documents in the second document set may be generated. Because the documents in the first document set and the second document set include topics minimally or not related to the topics in the source document, confidence scores for the first document set and second document set may be low or below a threshold confidence score. The low confidence scores may be an indication that the source document should not be stored or filed in first document set or second document set. As a result, a suggested filing location for the source document may not exist, and a new document set may be generated including only the source document. A title associated with the new document set may be generated, for example, based on the topic information, and the new title may be, for example, "Bull Fighting" and/or "Spain".

FIG. 5 shows an illustrative computer system 500 suitable for implementing methods and systems according to an aspect of the present disclosure. The computer system may comprise, for example, a computer running any of a number of operating systems. The above-described methods of the present disclosure may be implemented on the computer system 500 as stored program control instructions.

Computer system 500 includes processor 510, memory 520, storage device 530, and input/output structure 540. One or more input/output devices may include a display 545. One or more busses 550 typically interconnect the components, 510, 520, 530, and 540. Processor 510 may be a single or multi core.

Processor 510 executes instructions in which aspects of the present disclosure may comprise steps described in one or more of the Figures. Such instructions may be stored in memory 520 or storage device 530. Data and/or information may be received and output using one or more input/output devices.

Memory 520 may store data and may be a computer-readable medium, such as volatile or non-volatile memory, or any transitory or non-transitory storage medium. Storage device 530 may provide storage for system 500 including for example, the previously described methods. In various aspects, storage device 530 may be a flash memory device, a disk drive, an optical disk device, or a tape device employing magnetic, optical, or other recording technologies.

Input/output structures 540 may provide input/output operations for system 500. Input/output devices utilizing these structures may include, for example, keyboards, displays 545, pointing devices, and microphones—among others. As shown and may be readily appreciated by those skilled in the art, computer system 500 for use with the present disclosure may be implemented in a desktop computer package 560, a laptop computer 570, a hand-held computer, for example a tablet computer, personal digital assistant, mobile device, or smart phone 580, or one or more server computers which may advantageously comprise a "cloud" computer 590.

The systems and methods discussed herein and implemented using, for example, system 500, may be used to compute information and data related to billions of individual documents associated with millions of individual users in real-time. Individual users, for example, may each store, edit, modify, and otherwise manipulate thousands of documents. In some aspects of the present disclosure, generation, calculation, computation, determination and other methods and system operations discussed herein may be completed in parallel, simultaneously or in real-time for millions of individual users worldwide and/or globally.

At this point, while we have discussed and described the disclosure using some specific examples, those skilled in the art will recognize that our teachings are not so limited. Accordingly, the disclosure should be only limited by the scope of the claims attached hereto.

The invention claimed is:

1. A computer-implemented method for categorizing documents, comprising:
   receiving, at a computer system, topic information for a source document, the information including at least one topic and a weight for each topic, where the topic relates to content of the source document, and the weight represents how strongly the topic is associated with the source document;
   generating similarity scores based on a weight of each topic in the source document and the weight of the same topic in each document within one or more sets of documents, where each document in the one or more sets of documents comprises topic information;
   generating, based on the similarity scores, a confidence score for each of the document sets with respect to the source document;
   comparing the confidence score for each of the document sets to a threshold confidence score;
   categorizing the document sets into classes based on the comparison of confidence scores for each of the document sets;
   selecting one or more of the classes of document sets;
   determining one or more filing attributes for the source document based on the selected one or more classes of document sets; and
   outputting the filing attributes.

2. The method of claim 1, wherein generating a confidence score comprises:
   determining a mean score and a variance score based on the similarity scores associated with the documents in a document set.

3. The method of claim 1, wherein the outputting step comprises:
   outputting the filing attributes to a user.

4. The method of claim 3, further comprising:

filing the source document based on one or more of the filing attributes in response to user input.

5. The method of claim 1, comprising, after the comparing step:

generating a new document set including only the source document if the confidence score for each of the document sets is below a second threshold confidence score.

6. The method of claim 5, further comprising:

generating a title for the new document set based on the topic information associated with the source document.

7. The method of claim 1, wherein the threshold confidence score comprises a varying threshold confidence score generated using an automatic threshold detection process.

8. The method of claim 7, wherein the confidence scores comprise standard deviation scores.

9. The method of claim 7, wherein the categorizing step comprises automatic grouping.

10. The method of claim 1, wherein the source document is a member of the one or more document sets.

11. The method of claim 1, wherein the receiving, generating the similarity scores, generating the confidence score, comparing, categorizing, and the selecting steps are performed in response to a trigger event.

12. The method of claim 1, wherein the threshold confidence score comprises a varying threshold confidence score.

13. A computer-implemented system for determining document content comprising:

a non-transitory memory; and said system configured to:

receive topic information for a source document, the information including at least one topic and a weight for each topic, where the topic relates to content of the source document, and the weight represents how strongly the topic is associated with the source document;

generate similarity scores based on a weight of each topic in the source document and the weight of the same topic in each document within one or more sets of documents, where each document in the one or more sets of documents comprises topic information;

generate, based on the similarity scores, a confidence score for each of the document sets with respect to the source document;

compare the confidence score for each of the document sets to a threshold confidence score;

categorize the document sets into classes based on the comparison of confidence scores for each of the document sets;

select one or more classes of document sets;

determine one or more filing attributes for the source document based on the selected one or more classes of document sets; and output the filing attributes.

14. The system of claim 13, wherein to generate a confidence score the system is to:

determine a mean score and a variance score based on the similarity scores associated with the documents in a document set.

15. The system of claim 13, further configured to:

file the source document based on one or more of the filing attributes in response to user input.

16. The system of claim 13, further configured to:

generate a new document set including only the source document if the confidence score for each of the document sets is below a second threshold confidence score; and select the new document set.

17. A non-transitory computer storage medium having computer executable instructions which when executed by a computer cause the computer to perform operations comprising:

enabling a user to select a source document;

receiving topic information for the source document, the information including at least one topic and a weight for each topic, where the topic relates to content of the source document, and the weight represents how strongly the topic is associated with the source document;

generating similarity scores based on a weight of each topic in the source document and the weight of the same topic in each document within one or more sets of documents, where each document in the one or more sets of documents comprises topic information;

generating, based on the similarity scores, a confidence score for each of the document sets with respect to the source document;

comparing the confidence score for each of the document sets to a threshold confidence score;

categorizing the document sets into classes based on the comparison of confidence scores for each of the document sets;

selecting one or more of the classes of document sets;

determining one or more filing attributes for the source document based on the selected one or more classes of document sets; and outputting the filing attributes.

18. The non-transitory computer storage medium of claim 17, wherein the generating a confidence score operation comprises:

determining a mean score and a variance score based on the similarity scores associated with documents in a document set.

19. The non-transitory computer storage medium of claim 17, which further causes the computer to perform further operations comprising:

filing the source document based on one or more of the filing attributes in response to user input.

\* \* \* \* \*